May 12, 1931.  O. JOHNSON  1,805,402
AUTOMOBILE TRANSMISSION HOIST
Filed April 9, 1928
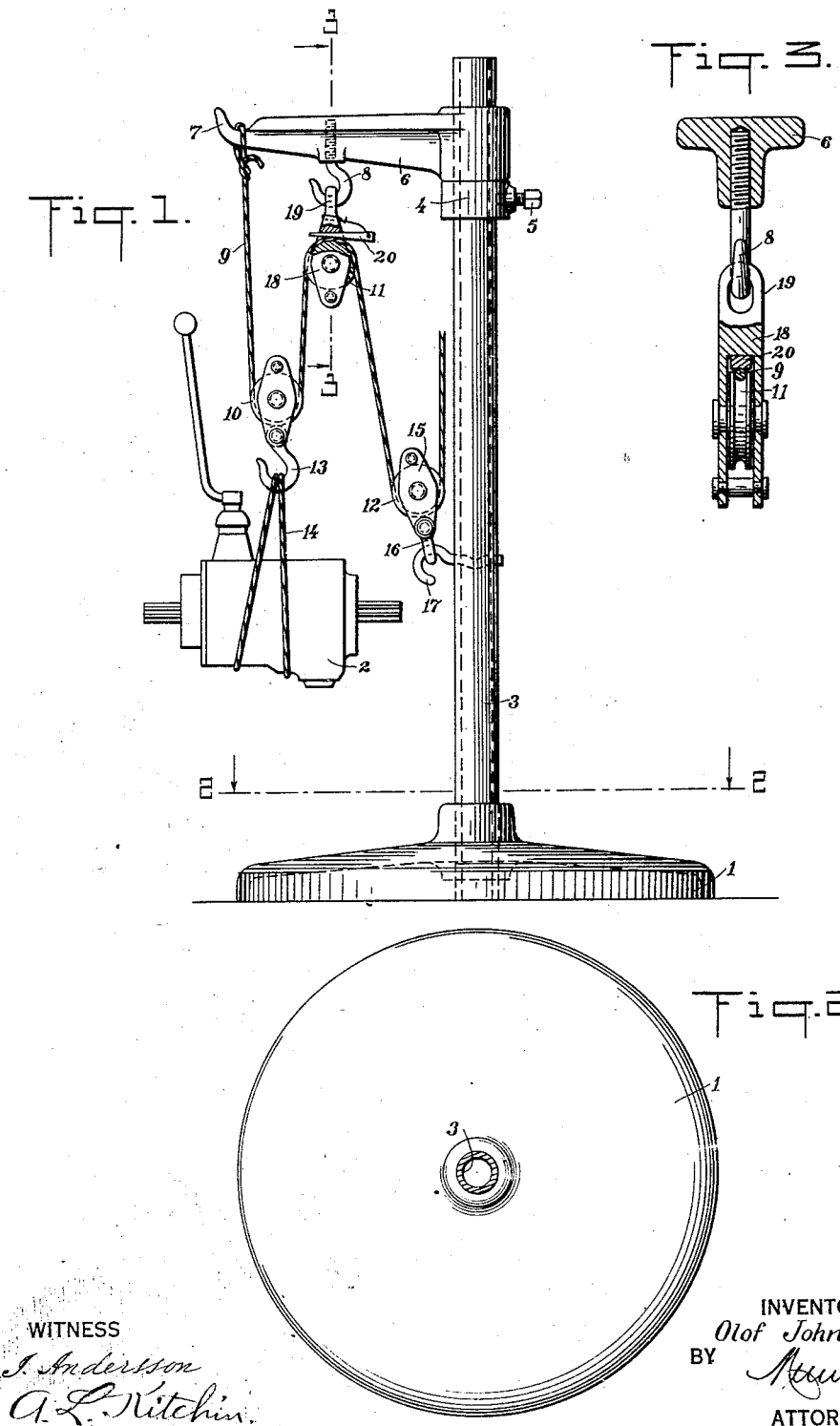
INVENTOR
Olof Johnson
BY
ATTORNEY Patented May 12, 1931

1,805,402

UNITED STATES PATENT OFFICE

OLOF JOHNSON, OF NORTHVILLE, NEW YORK

AUTOMOBILE TRANSMISSION HOIST

Application filed April 9, 1928. Serial No. 268,527.

This invention relates to hoisting mechanism, and particularly to an improved construction especially adapted as an automobile transmission hoist, the object being to provide an improved construction which may be disassembled and then assembled in position preparatory to raising or lowering an automobile transmission or some other part of an automobile or other machine.

Another object of the invention is to provide a hoist which may be used in connection with inserting or removing a transmission for an automobile, wherein after the foot boards of the automobile have been removed, the base of the hoist may be arranged at a desired position, and then the other parts mounted thereon ready for use, the structure being such that the parts may be disassembled and removed piece by piece after having functioned in the desired manner.

In the accompanying drawings—

Figure 1 is a side view of a hoist disclosing an embodiment of the invention, the same being shown in connection with the transmission of an automobile.

Figure 2 is a sectional view through Figure 1, approximately on line 2—2.

Figure 3 is a fragmentary sectional view through Figure 1, approximately on line 3—3, the same being on an enlarged scale.

In automobiles and other machinery, it is sometimes very difficult to insert or remove a certain part of the machine, and various expedients must be used to hold the parts in place while being bolted or otherwise secured properly and permanently in position. In the case of a transmission of an automobile, it is extremely difficult to hold the parts in place while applying the proper bolts and making the proper connections. Various means heretofore have been provided for holding the parts in position, but usually an assistant mechanic is utilized to hold certain parts in place while the chief mechanic does the work of connecting up the parts. To avoid this double use of workmen, and to properly hold the transmission or other piece of machinery in place, an improved form of hoist is provided which may be disassembled and then reassembled in the position in which it is to be used.

In the case of an automobile transmission, the floor boards are taken up and then the base 1 arranged to a desired point below and near the transmission 2. The standard 3 is then placed in the base 1 where it is held by friction with its lower end resting on the floor or ground, as the case may be, and presents a proper support for different articles. This standard is shown as hollow, but it may be solid if desired. A collar 4 is slidingly mounted on standard 3 and is locked in any desired position along the standard by a suitable set screw 5. Arranged above the collar 4 is an arm 6 slidingly and swingably mounted on the standard 3. This arm is provided with a hook 7 at the outer end and a hook 8 intermediate the ends. The hook 7 accommodates one end of a cable 9 which is adapted to pass through the pulley wheel 10 and thence through the pulley wheel 11 to and over the pulley wheel 12, and from pulley wheel 12 to any convenient point where the cable may be pulled for elevating the pulley wheel 10 and the entire pulley structure, including the hook 13 which is interlocked with the cable 14 looped over the transmission 2. In this way, the transmission 2 may be raised or lowered, and also may be held in any desired position above the ground so that one workman can easily secure the parts in position. The pulley wheel 12 is part of a complete pulley structure 15 connected by a link 16 to the hook 17 carried by standard 3. Pulley 11 is arranged in a frame 18 which completes the pulley structure, said frame having an eye 19 through which the hook 8 extends. A wedge 20 is positioned to engage the cable 9 where it passes through the frame 18 as shown in Figures 1 and 2, whereby the cable may be freely pulled in one direction but is prevented movement in the opposite direction.

When it is desired to lower the transmission or other piece of machinery, cable 9 is pulled slightly for releasing wedge 20, and the wedge is then manually removed and the cable paid-out for lowering the transmission and other parts as desired. When it is desired to hold the transmission 2 and other parts in a certain position, wedge 20 is inserted as shown in Figure 1 and the parts are held in proper position without the necessity of tying the end of cable 9. In case of removing a transmission after the hoist has been placed in position near the transmission as above described, and the transmission disconnected and lowered, the hoist may be left in that position until the transmission has been repaired or inspected, and then the hoist may be utilized for raising the transmission and holding the same in proper position to be accurately and easily bolted or otherwise secured in its correct operating position. After the transmission has been properly connected up, wedge 20 is released and hook 13 disengaged from cable 14. Cable 14 is then removed. After this has been done, the link 16 is disengaged from hook 17 and arm 6 slid off of the standard 3. These parts are moved to a distant point and then the standard 3 is lifted out of base 1 and moved to a distant point. Base 1 is then removed and the hoist is disassembled and ready to be assembled in a new position for functioning as a hoist. The fact that the parts are readily capable of being assembled and disassembled and adjusted so that the arm 6 may be high or low, permits the hoist to be used in what may be termed difficult places, and where ordinary hoisting means could not possibly be used.

In using the device described many uses may be found therefor, but it is particularly adapted for machinery and especially transmission hoists. As shown in the drawing, the invention is presented as a hoist for automobile transmissions and other objects with the framework so constructed that it may be disassembled and reassembled through part of an automobile after the floor boards have been removed or through any other object like different kinds of machinery where lifting or lowering is necessary.

What I claim is:

A hoist for automobile transmissions and other objects, including a supporting standard and arm, a pulley structure carried by said arm, a pulley structure carried by said standard, a pulley structure adapted to be connected with the transmission to be lifted, a cable extending through all of said pulley structures and connected at one end with said arm whereby when the cable is pulled in one direction said transmission will be raised, the pulley structure carried by said arm having a solid frame with a passage-way above the cable extending therethrough, a wedge positioned in the passageway, and means connecting the wedge to the frame of the pulley structure so that the small end of the wedge extends in the same direction as the free end of the arm whereby when the load of the transmission is applied to the second named pulley structure movement of the cable will cause the wedge to squeeze the cable to prevent an appreciable movement thereof, and when a pulling force is applied to the cable to draw the same towards the standard, the wedge will be loosened.

Signed at Northville in the county of Fulton and State of New York this 29 day of March A. D. 1928.

OLOF JOHNSON.